United States Patent Office 3,131,777
Patented May 5, 1964

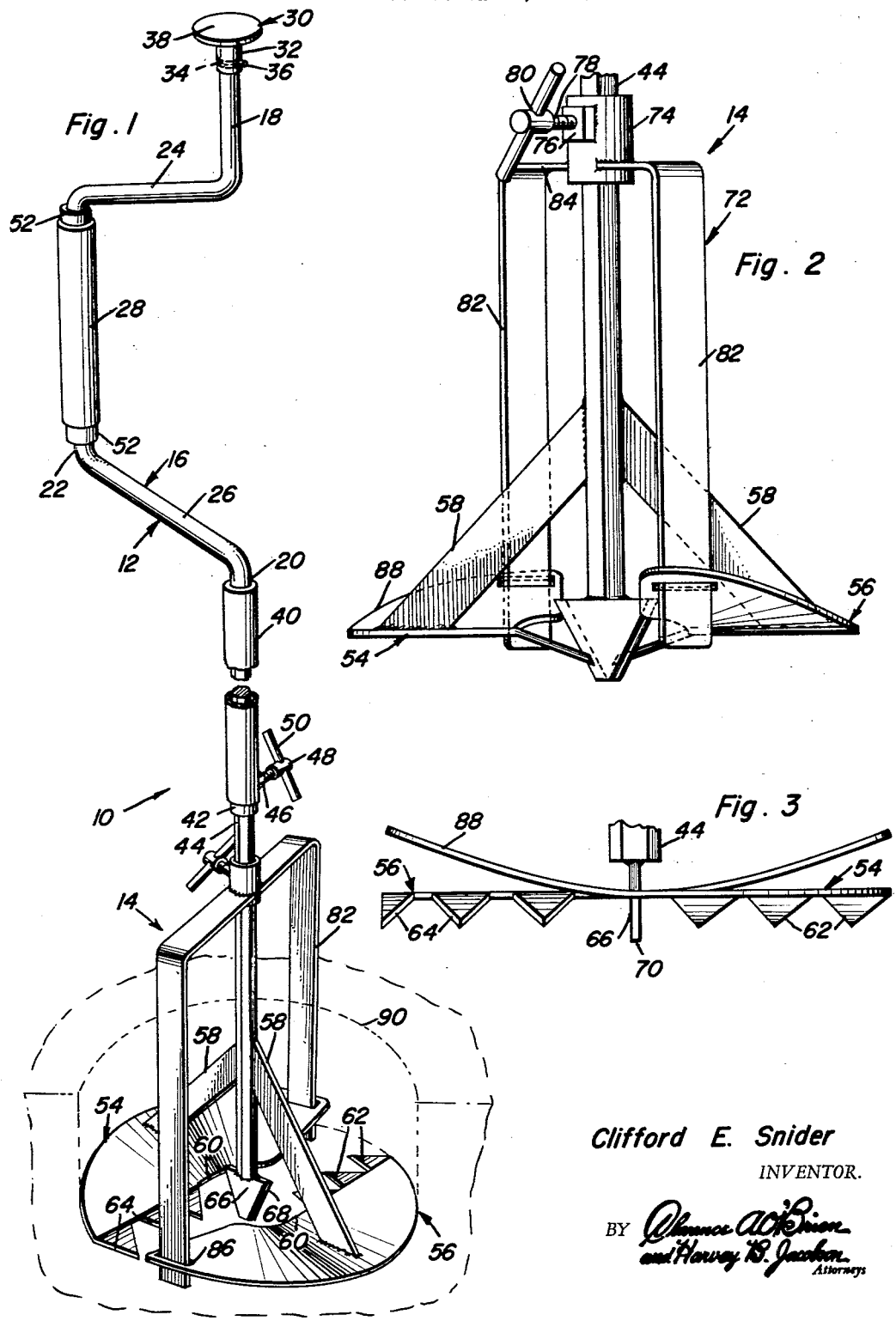

3,131,777
ICE AUGER
Clifford E. Snider, 114 W. Benton, Greenville, Mich.
Filed Mar. 27, 1962, Ser. No. 182,738
2 Claims. (Cl. 175—18)

This invention relates to augers, and particularly to augers for drilling and cleaning holes in ice whereby the holes may be used for ice fishing.

It is a primary object of the invention to provide an ice cutting auger which is provided with adjustable means whereby the auger will cut in a highly efficient manner regardless of the temperature and condition of the ice being cut.

The ice cutting condition changes with the temperature; the lower the temperature, the easier the ice cuts. The higher the temperature, the harder it cuts. When the temperature is low, the ice is dry and brittle which is easier to cut, the ice chips move up easier then and don't have the tendency to pack on the cutting blade. When the temperature goes up the ice becomes wet, and then it chips harder. The chips pack in the hole above the cutting plate, which puts pressure on the auger teeth, making them cut more than the operator has the capacity to turn, which makes the auger very difficult to operate. Thus, the chipped ice above the auger puts a pressure on the teeth of the auger and causes the teeth to catch or drag in the hole being cut. Also, the wet ice tends to freeze to the blades thereby increasing the effective thickness thereof making it more difficult to move the blades through the pieces of ice previously cut. However, the ice auger disclosed herein is provided with an adjustable means which prevents the teeth of the ice auger from cutting too deeply and binding. If the auger is properly adjusted, it will cut very smooth and efficiently, and consequently will be very easy to operate.

It is another object of the invention to provide an ice auger with adjustable shoes which not only regulate the penetration of the auger teeth into the ice, but also the shoes run close to the edge of the hole being cut thereby scraping away the ice chips from the edge of the hole so as to permit the auger to be rotated more easily. This is particularly important when the ice is wet.

It is another object of the invention to provide an ice auger having cutting teeth on opposite sides thereof which are arranged at different radial distances from the center of rotation of the auger whereby the teeth on one side of the auger will cut grooves into the ice and the teeth on the opposite side will chip the ridges of ice formed between the grooves. Since it is much easier to chip ice than to cut ice, this also permits the auger to be operated much more easily and effectively.

It is another object of my invention to provide an ice auger having an adjustable handle whereby the length of the auger handle may be increased as the depth of the hole being bored increases.

It is another object of the invention to provide an ice auger which is relatively simple in design, economical to manufacture, light in weight, durable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the ice auger in operative position in a hole in ice cut thereby;

FIGURE 2 is an enlarged front elevational view of the head of the ice auger; and FIGURE 3 is a side elevational view of the cutting blades and a portion of the head shown in FIGURE 2.

Referring to the drawings, it can be seen that the ice auger 10 comprises a handle assembly 12 and a head 14.

The handle assembly 12 includes a crank 16 composed of a rod circular in cross section and bent so as to have coaxial spaced straight ends 18 and 20 connected to a handgrip portion 22 parallel thereto by means of radially extending legs 24 and 26. A tubular handgrip 28 is rotatably journalled on the handgrip portion 22 between the legs 24 and 26.

A knob 30 is rotatably journalled on the upper portion of end 18 by means of a cylindrical sleeve 32 integral with the knob which telescopically receives the upper portion of end 18. The upper portion of end 18 is provided with an annular peripheral groove 34 which receives one end of a setscrew 36 which is threaded through one side of the sleeve 32. Knob 30 has an upper convex rounded surface 38.

The handle assembly 12 is provided with a tubular extension 40 at its lower end which telescopically receives the end 20 and is fixed thereto.

The lower end of the extension 40 telescopically receives a tubular bushing 42 secured within the sleeve. Bushing 42 is provided with a central hexagonal aperture therethrough for receiving slidably a hexagonal drive shaft 44 of the head 14. Directly above bushing 42, a hexagonal nut 46 is welded to one side of the tubular extension 40 and concentric with a bore formed in the tubular extension. A setscrew 48 is threaded into nut 46 and has one end extending into the tubular extension 40. The outer end of the screw 48 is provided with a diametrical bore in which is secured an operating handle 50.

The handgrip 28 is prevented from axial movement on the handgrip portion 22 by means of a pair of washers 52 welded to the handgrip portion adjacent each end of the handgrip 28.

Head 14 includes a pair of substantially identical substantially semi-circular plates 54 and 56 secured concentrically around the lower end of shaft 44.

The peripheral edges of the plates 54 and 56 define a circle concentric with the axis of rotation of shaft 44. Each plate is secured to the shaft 44 by means of a diagonal strut 58 which extends between a central portion of each plate and a lower portion of shaft 44. The struts 58 are fixed to the plates and shaft 44 by conventional means such as welding.

The inner edge of each plate is provided with a notched-out portion 60. Plate 56 is provided with a radial row of triangular teeth 62 extending in a circumferential direction within the notched-out portion 60. In a similar manner, the plate 54 is provided with a radial row of teeth 64 extending circumferentially into its notched-out portion 60. All the teeth are deflected downwardly slightly so that the points thereof are spaced below the planes of the supporting plates 54 and 56. The teeth on each plate are of substantially the same size and shape, however, the points of the teeth 64 are spaced radially outwardly from the center of shaft 44 a distance greater than the spacing of the points of the teeth 62 from the center of shaft 44 a distance equal to one-half of the distance between the points of each pair of adjacent teeth. This is so that the points of the teeth 64 will define circular paths that lie halfway between the paths defined by the points of the teeth 62 when the teeth are rotated about the axis of shaft 44.

The half of each plate 54 and 56 supporting the teeth is flat and perpendicular to the axis of shaft 44 However, the other half of each plate is curved arcuately upwardly as illustrated in FIGURE 3. The teeth 62 and 64 have beveled knife-like side edges.

The lower end of shaft 44 is welded to a downwardly extending triangular pointed plate 66. Plate 66 also has preferably beveled knife-like side edges 68 which converge to a point 70 in a downward direction.

Head 14 also includes an adjustable yoke 72. Yoke 72 includes a tubular sleeve 74 slidable on shaft 44 and provided with a radial bore in one side thereof. A nut 76 is welded to a side of the sleeve 72 concentric with the bore therein. A screw 78 provided with a T-shaped handle 80 is threaded into the nut 76 and extends through the radial bore in sleeve 74 so as to selectively engage the outer surface of shaft 44. A pair of substantially vertically extending shoes 82 are welded to diametrically opposite sides of sleeve 74 by radial flanges 84 integral with the shoes. The lower ends of the shoes 82 extend slidably through rectangular slots 86 formed in the outer edges of the arcuate portions 88 of plates 54 and 56.

When is it desired to bore a hole in ice as illustrated at 90, the operator holds the handgrip 28 in one hand and the knob 30 in his other hand and presses the point 70 vertically downwardly into the ice. The operator then holds knob 30 stationary and rotates handgrip 28 whereby the point 70 since it extends below the blades 54 and 56 cuts a conical guide hole into the ice. Further rotation of the auger 10 causes the leading edges of the teeth 64 and 66 to cut a plurality of annular concentric grooves V-shaped in cross section. Since each tooth cuts its own separate groove, the teeth on one side of the head chip away the ice between the grooves formed by the teeth on the opposite side of the head. This chipping of the ice between the grooves permits the auger to be rotated rather easily and to cut at a considerably faster rate than conventional augers. If the ice is too wet or too soft, the shoes 82 are adjusted vertically by means of screw 78 so that the bottom of the shoes which ride on the ice are spaced only a very small distance above the points of the teeth 62 and 64. This prevents the teeth from cutting too deeply into the ice and thereby causing the auger to bind. Also, as the auger is rotated, the shoes 82 being adjacent the sides of the hole 90 cut in the ice rub against the sides of the hole and scrape away all the loose ice thereby permitting the teeth to cut more efficiently. When cutting in dry ice which occurs at very cold temperatures, the lower ends of the shoes 82 may be adjusted to a higher elevation thereby permitting the teeth 62 and 64 to bite more deeply into the ice for more rapid and effective cutting.

As the depth of the hole 90 increases, the effective length of the handle assembly 12 may also be increased merely by loosening setscrew 48, sliding the handle assembly 12 upwardly in relation to the shaft 44 and locking the handle assembly to the shaft in the newly adjusted position by means of the setscrew 48.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling withing the scope of the invention as claimed.

What is claimed as new is as follows:

1. An ice auger comprising a shaft means, operating means connected to one end of the shaft means for rotating same about its axis, cutting means secured to the other end of the shaft means comprising at least one cutting element on opposite sides of the shaft means, stop means connected to said shaft means, said stop means limiting the degree of penetration of the cutting elements into the ice and being adjustable longitudinally relative to the axis of said shaft means, said stop means including an inverted U-shaped member, connecting means adjustably connecting the said U-shaped member to said shaft means, the free end of said U-shaped member extending through apertures in the edges of said cutting means.

2. An ice auger comprising a shaft means, operating means connected to one end of the shaft means for rotating same about its axis, cutting means secured to the other end of the shaft means comprising at least one cutting element on opposite sides of the shaft means, each of said cutting elements being spaced at a different radial distance from the axis of rotation of said shaft means, stop means connected to said shaft means, said stop means limiting the degree of penetration of the cutting elements into the ice and being adjustable longitudinally relative to the axis of said shaft means, said stop means including an inverted U-shaped member, connecting means adjustably connecting said U-shaped member to said shaft means, the free ends of said U-shaped member extending through apertures in the edges of said cutting means.

References Cited in the file of this patent

UNITED STATES PATENTS

| | | |
|---|---|---|
| 1,013,823 | Sheldon | Jan. 2, 1912 |
| 2,320,610 | Kandle | June 1, 1943 |
| 2,393,282 | Berlin | Jan. 22, 1946 |
| 2,733,047 | Morgan | Jan. 31, 1956 |
| 2,766,014 | Hanson | Oct. 9, 1956 |
| 2,854,218 | Hedrick et al. | Sept. 30, 1958 |

FOREIGN PATENTS

| | | |
|---|---|---|
| 59,907 | Sweden | Nov. 24, 1925 |
| 465,172 | France | Apr. 9, 1914 |